US012655270B2

(12) United States Patent
Hayashi et al.

(10) Patent No.: US 12,655,270 B2
(45) Date of Patent: Jun. 16, 2026

(54) ADDITIVE FOR ORGANIC CONDUCTOR, METHOD FOR PRODUCING SAME, ORGANIC CONDUCTOR, AND ELECTROLYTIC CAPACITOR

(71) Applicant: Panasonic Intellectual Property Management Co., Ltd., Osaka (JP)

(72) Inventors: Keisuke Hayashi, Osaka Fu (JP); Nobuyuki Matsuzawa, Osaka Fu (JP); Toshiyuki Takizawa, Kyoto Fu (JP); Hiroyuki Maeshima, Hyogo Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 768 days.

(21) Appl. No.: 17/922,549

(22) PCT Filed: Apr. 19, 2021

(86) PCT No.: PCT/JP2021/015917
§ 371 (c)(1),
(2) Date: Oct. 31, 2022

(87) PCT Pub. No.: WO2021/230013
PCT Pub. Date: Nov. 18, 2021

(65) Prior Publication Data

US 2023/0167271 A1 Jun. 1, 2023

(30) Foreign Application Priority Data

May 13, 2020 (JP) ................................ 2020-084774

(51) Int. Cl.
*C08K 5/42* (2006.01)
*H01G 9/028* (2006.01)
*H01G 9/15* (2006.01)

(52) U.S. Cl.
CPC ............... *C08K 5/42* (2013.01); *H01G 9/028* (2013.01); *H01G 9/15* (2013.01)

(58) Field of Classification Search
CPC . C08K 5/42; H01G 9/028; H01G 9/15; H01G 9/0036
See application file for complete search history.

(56) References Cited

U.S. PATENT DOCUMENTS 4,365,086 A * 12/1982 McKellin ................ C08K 5/14 562/512
2004/0027399 A1 2/2004 Wright et al.
(Continued)

FOREIGN PATENT DOCUMENTS

JP H1172969 A 3/1999
JP 2004-161994 A 6/2004
(Continued)

OTHER PUBLICATIONS

International Search Report issued in International Patent Application No. PCT/JP2021/015917 mailed Jun. 8, 2021; with English translation.
(Continued)

*Primary Examiner* — Aiqun Li
(74) *Attorney, Agent, or Firm* — Rimon P.C.

(57) ABSTRACT

An additive for an organic conductor includes a naphthalene ring, at least two sulfonic acid groups bonded to the naphthalene ring, and at least one carboxy group bonded to the naphthalene ring. In the case where the number of the sulfonic acid groups is two, when the sulfonic acid groups are respectively referred to as a first sulfonic acid group and a second sulfonic acid group, and a carbon atom of the naphthalene ring bonded to the first sulfonic acid group and a carbon atom of the naphthalene ring bonded to the second sulfonic acid group are respectively referred to as a first carbon atom and a second carbon atom, the number n of
(Continued)

carbon atoms present between the first carbon atom and the second carbon atom is three or less.

5 Claims, 1 Drawing Sheet

(56) References Cited

U.S. PATENT DOCUMENTS

| | | | | |
|---|---|---|---|---|
| 2006/0223976 | A1* | 10/2006 | Tozawa | H01G 9/028 528/373 |
| 2015/0262754 | A1 | 9/2015 | Nagashima et al. | |
| 2020/0279691 | A1 | 9/2020 | Fukui et al. | |

FOREIGN PATENT DOCUMENTS

| | | | |
|---|---|---|---|
| JP | 2006-108650 | A | 4/2006 |
| JP | 2010-090324 | A | 4/2010 |
| WO | 2014/087617 | A1 | 6/2014 |
| WO | 2019/131476 | A1 | 7/2019 |

OTHER PUBLICATIONS

Chinese Office Action dated Feb. 12, 2023 issued in the corresponding Chinese Patent Application No. 202180033106, with English translation of Search Report.

Organic Synthesis Unit Process, 1st Edition.

* cited by examiner

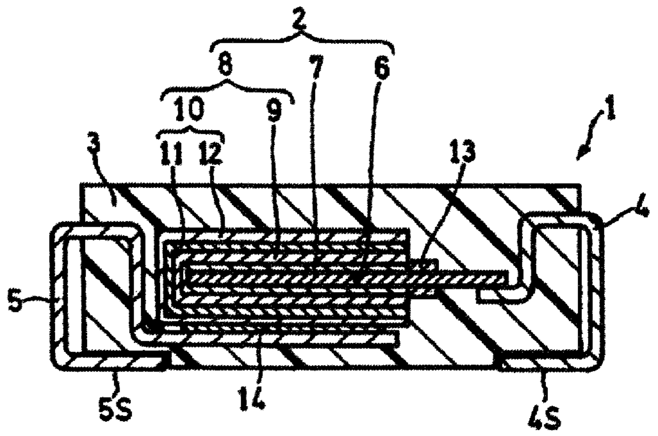
2
8
7
6
10
9
1
3
11
12
13
4
5
5S
14
4S

ADDITIVE FOR ORGANIC CONDUCTOR, METHOD FOR PRODUCING SAME, ORGANIC CONDUCTOR, AND ELECTROLYTIC CAPACITOR

CROSS-REFERENCE TO RELATED APPLICATIONS

This application is the U.S. National Phase under 35 U.S.C. § 371 of International Patent Application No. PCT/JP2021/015917, filed on Apr. 19, 2021, which in turn claims the benefit of Japanese Patent Application No. 2020-084774, filed on May 13, 2020, the entire content of each of which is incorporated herein by reference.

TECHNICAL FIELD

The present disclosure relates to an additive for an organic conductor and a method for manufacturing the same, an organic conductor, and an electrolytic capacitor.

BACKGROUND ART

A conjugated polymer, such as polythiophene or polypyrrole, exhibits electrical conductivity by addition of a dopant. The conjugated polymer added with a dopant is called, for example, a conductive polymer or an organic conductor. Also, in recent years, a self-doping type organic conductor has been developed. The performance of the organic conductor can be controlled to some extent by selecting the kind of the conjugated polymer or the kind of the additive (e.g., dopant). In addition, the organic conductor is inexpensive and light in weight. For these reasons, the organic conductor has been used in various electronic components. Examples of the dopant used as the additive include a proton addition-type compound and an electron oxidation-type compound.

For example, adding an organic sulfonic acid to the solid electrolyte layer of a solid electrolytic capacitor has been proposed (Patent Literatures 1 and 2).

CITATION LIST

Patent Literature

[PTL 1] Japanese Laid-Open Patent Publication No. 2006-108650

[PTL 2] International Publication WO 2019/131476

SUMMARY OF INVENTION

Technical Problem

In an electronic device including an organic conductor, when operated in a high humidity environment, capacity deterioration and resistance value increase may occur in some cases. This is presumably because water molecules are adsorbed into the organic conductor in a high humidity environment, and the additive molecules are peeled off from the conjugated polymer.

Solution to Problem

A first aspect of the present disclosure relates to an additive for an organic conductor, including:

a naphthalene ring; at least two sulfonic acid groups bonded to the naphthalene ring; and at least one carboxy group bonded to the naphthalene ring, wherein in a case where a number of the sulfonic acid groups is two, when the sulfonic acid groups are respectively referred to as a first sulfonic acid group and a second sulfonic acid group, and a carbon atom of the naphthalene ring bonded to the first sulfonic acid group and a carbon atom of the naphthalene ring bonded to the second sulfonic acid group are respectively referred to as a first carbon atom and a second carbon atom, a number n of carbon atoms present between the first carbon atom and the second carbon atom is three or less.

A second aspect of the present disclosure relates to an organic conductor, including: a conjugated polymer; and the aforementioned additive.

A third aspect of the present disclosure relates to an electrolytic capacitor, including: an anode body having a dielectric layer at a surface, and a solid electrolyte covering part of the dielectric layer, wherein the solid electrolyte includes the aforementioned organic conductor.

A fourth aspect of the present disclosure relates to a method for manufacturing the aforementioned additive for an organic conductor, the method including:

a step of preparing a naphthalene compound having a naphthalene ring, the at least two sulfonic acid groups bonded to the naphthalene ring, and at least one amino group bonded to the naphthalene ring;

a step of converting the amino group to a cyano group; and a step of converting the cyano group to the carboxy group by hydrolysis, to produce the additive.

Advantageous Effects of Invention

It is possible to provide an additive that can remarkably improve the moisture resistance of an organic conductor, an organic conductor having excellent moisture resistance, and an electrolytic capacitor using the organic conductor.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A schematic cross-sectional view of an electrolytic capacitor according to one embodiment of the present disclosure.

DESCRIPTION OF EMBODIMENTS

An additive for an organic conductor of the present disclosure includes a naphthalene ring, at least two sulfonic acid groups bonded to the naphthalene ring, and at least one carboxy group bonded to the naphthalene ring. When the number of the sulfonic acid groups is two, the sulfonic acid groups are respectively referred to as a first sulfonic acid group and a second sulfonic acid group, and a carbon atom of the naphthalene ring bonded to the first sulfonic acid group and a carbon atom of the naphthalene ring bonded to the second sulfonic acid group are respectively referred to as a first carbon atom and a second carbon atom. In this case, the number n of carbon atoms present between the first carbon atom and the second carbon atom is three or less.

Such an additive acts to extract electrons of a conjugated polymer, to convert an insulator or semiconductor into a good conductor. Therefore, an additive that acts as above is generally called a dopant. It has been found that when an organic conductor containing the above additive and a conjugated polymer is used in the solid electrolyte layer of an electrolytic capacitor, the rate of change in equivalent series resistance (ESR) during operation of the electrolytic capacitor in a high humidity environment can be remarkably reduced. The rate of change in ESR during operation of the electrolytic capacitor in a high humidity environment is hereinafter sometimes simply referred to as ΔESR. The ΔESR has a tendency to increase especially at high temperatures (e.g., 80° C. or higher). Therefore, even though the increase in ΔESR is not so problematic at relatively low temperatures (e.g., 60° C. or lower), the increase in ΔESR may become significant at high temperatures.

The above additive has at least two sulfonic acid groups in relatively close positions on the naphthalene ring. The at least two sulfonic acid groups therefore tend to approach the conjugated polymer. Furthermore, since the carboxy group is bonded to the naphthalene ring, the sulfonic acid groups tend to approach the conjugated polymer more preferentially than the carboxy group, and the electron acceptor performance of the additive can be improved as a whole by the electron-withdrawing property of the carboxy group. It can be seen that this results in an increased binding force between the additive and the conjugated polymer. It is considered, therefore, that even when the organic conductor adsorbs water molecules in a high humidity environment, the peeling off of the additive molecules from the conjugated polymer can be drastically suppressed, the increase in the resistance of the organic conductor can be suppressed, and the high conductivity can be maintained. Presumably as a result, the ΔESR can be remarkably reduced. Such an effect produced by using the above additive can be ensured even in a high temperature (e.g., 80° C. or higher) and high humidity environment. It is to be noted that, with a naphthalene compound having one sulfonic acid group and two or more carboxy groups, there is a case when the naphthalene compound coordinates via the carboxy groups with the conjugated polymer. In this case, it is considered that the electron acceptor performance of the additive degrades, and the binding force between the additive and the conjugated polymer tends to decrease as a whole, reducing the effect of suppressing the increase in the resistance of the organic conductor. As described above, the aforementioned additive can suppress the increase in the resistance of the organic conductor in a high humidity environment, and can remarkably improve the moisture resistance of the organic conductor. When an organic conductor containing the additive is used in the solid electrolyte of an electrolytic capacitor, the increase in ΔESR in a high humidity environment can be suppressed. Here, the peeling off of the additive molecules serving as the dopant from the conjugated polymer is sometimes referred to as dedoping.

The position numbers of the carbons constituting the naphthalene ring are as shown in the following formula (I).

[Chem. 1]

(I)

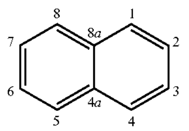

In the present specification, in the naphthalene ring, with focuses on the shortest carbon chain among the carbon chains connecting the first carbon atom and the second carbon atom to each other, the number n is the number of the carbon atoms located between the first carbon atom and the second carbon atom. In this way, the number n is determined such that the number n of the carbon atoms located between the first carbon atom and the second carbon atom is the smallest. The number n does not include the number of the first and second carbon atoms. The carbon chains are those constituting the naphthalene ring, and do not include the substituent on the naphthalene ring. For example, in the case of 4,8-disulfo-2-naphthoic acid represented by the following formula (ia), the shortest carbon chain among the carbon chains connecting the first carbon atom at 4-position and the second carbon atom at 8-position to each other is a carbon chain connecting the carbon atoms at positions 4, 4a, 8a, and 8 in this order. Between the first carbon atom at 4-position and the second carbon atom at 8-position, two carbon atoms are present at positions 8a and 4a. The number n is, therefore, two. In the case of 4,7-disulfo-2-naphthoic acid represented by the following formula (ib), the shortest carbon chain among the carbon chains connecting the first carbon atom at 4-position and the second carbon atom at 7-position to each other is a carbon chain connecting the carbon atoms at positions 4, 4a, 8a, 8 and 7 in this order (or a carbon chain connecting the carbon atoms at positions 4, 4a, 5, 6, and 7 in this order). Between the first carbon atom at 4-position and the second carbon atom at 7-position, three carbon atoms are present at positions 4a, 8a, and 8 (or at positions 4a, 5, and 6). The number n is, therefore, three.

[Chem. 2]

(Ia)

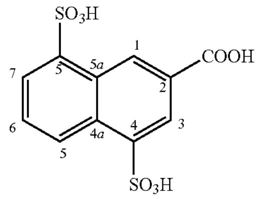

(Ib)

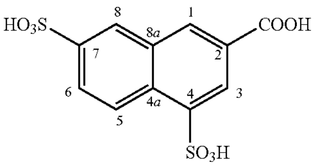

In the additive of the present disclosure, when the number of the sulfonic acid groups is two, the n is three or less. The additive therefore does not encompass a compound in which sulfonic acid groups are bonded at both 2- and 6-positions, or a compound in which sulfonic acid groups are bonded at both 3- and 7-positions. This is because the n is four in these compounds.

When the number of the sulfonic acid groups is three or more, with focuses on two carbon atoms bonded to two sulfonic acid groups in the closest positions, the number of the carbon atoms present between the two carbon atoms can be determined in a similar manner as described above for the case when the number of the sulfonic acid groups is two. The number thus determined is three or less.

In the additive and the organic conductor, the sulfonic acid group may be contained in a free form ($—SO_3H$) or in an anionic form ($—SO_3^-$), or may be contained in the form of a salt. In the organic conductor, the sulfonic acid group may be contained in the form of bonding to or interacting with the conjugated polymer. In the present specification, all these forms of sulfonic acid groups, including those in other forms, are sometimes simply referred to as the "sulfonic acid group." Likewise, in the additive and the organic conductor, the carboxy group may be contained in a free form (—COOH) or in an anionic form ($—COO^-$), or may be contained in the form of a salt. In the organic conductor, the carboxy group may be contained in the form of bonding to or interacting with the conjugated polymer. In the present specification, all these forms of carboxy groups, including those in other forms, are sometimes simply referred to as the "carboxy group". The salt may be a salt of a sulfonate or carboxylate anion with an any base selected from an organic base (e.g., organic amine, organic ammonium) and an inorganic base (e.g., metal hydroxide, ammonia).

In the following, the additive for an organic conductor, a method for manufacturing the additive, an organic conductor, and an electrolytic capacitor of the present disclosure will be more specifically described below.

[Additive for Organic Conductor]

The additive has three or more sulfonic acid groups bonded to a naphthalene ring. Alternatively, when the additive has two sulfonic acid groups, the number n of the carbon atoms presents between the first carbon atom and the second carbon atom bonded respectively to the two sulfonic acid groups is three or less. As understood therefrom, in the additive of the present disclosure, at least two sulfonic acid groups are located relatively closely to each other on the naphthalene ring. Therefore, as described above, a high bonding strength to the conjugated polymer can be obtained, and the increase in the resistance of the organic conductor can be suppressed even in a high humidity environment. In view of further suppressing the increase in the resistance of the organic conductor in a high humidity environment, the number n is preferably two or one.

The number of the sulfonic acid groups is at least two, may be two to five, and may be two or three. In view of allowing the electron-withdrawing property of the carboxy group to be exhibited easily, the number of the sulfonic acid groups is preferably two.

The number of the carboxy groups is at least one, and may be one to six, or one to four, and may be one or two. From the viewpoint that the sulfonic acid groups can easily preferentially coordinate with the conjugated polymer, the number of the carboxy groups in the naphthalene ring is preferably two or less, more preferably one.

The additive may have, on the naphthalene ring, a first substituent other than the sulfonic acid group and the carboxy group. A compound having the first substituent is also encompassed in the additive of the present disclosure. The first substituent may be an electron-donating group, an electron-withdrawing group other than the sulfonic acid group and the carboxy group, and the like, but is preferably a hydrocarbon group because, in this case, a higher electron acceptor function tends to be exhibited due to the balance between the sulfonic acid groups and the carboxy group(s). The hydrocarbon group may be any of aliphatic, alicyclic, and aromatic groups. In terms of ease of coordination with the conjugated polymer, the hydrocarbon group is preferably an aliphatic hydrocarbon group. The aliphatic hydrocarbon group has, for example, one to ten carbon atoms, and may be one to six, or one to four carbon atoms. The aliphatic hydrocarbon group may be saturated or unsaturated. Examples of the aliphatic hydrocarbon group include an alkyl group, an alkenyl group, an alkynyl group, and a dienyl group. Preferred among them is an alkyl group. Examples of the alkyl group include methyl group, ethyl group, n-propyl group, isopropyl group, n-butyl group, isobutyl group, sec-butyl group, tert-butyl group, hexyl group, octyl group, and 2-ethylhexyl group. The additive may have one first substituent, or two or more first substituents. When the additive has two or more first substituents, at least two of the first substituents may be the same, or all the first substituents may be different.

From the view point that a higher electron acceptor function can be easily exhibited due to the balance between the sulfonic acid groups and the carboxy group(s), it is also preferable that the additive does not have the first substituent, The naphthalene ring of the additive may have a non-aromatic ring Z condensed therewith. In the additive having such a structure, for example, a plurality of (e.g., two) carbon atoms among the carbon atoms at positions 1 to 8 of the naphthalene ring are connected to each other by an aliphatic chain. The aliphatic chain may be saturated or unsaturated. Such a structure includes, for example, an acenaphthene ring. The additive may have one, or two or more second substituents on the aliphatic chain. Examples of the second substituent include a sulfonic acid group, a carboxy group, and the groups described for the first substituent. When the additive has two or more second substituents, at least two of the second substituents may be the same, or all the second substituents may be different.

In view of bringing close to the conjugated polymer, the naphthalene ring of the additive preferably does not have the above-described non-aromatic ring Z condensed therewith.

In view of enhancing the effect of suppressing the increase in the resistance of the organic conductor in a high humidity environment, the additive preferably has two sulfonic acid groups, i.e., the first and second sulfonic acid groups, and one carboxy group. In particular, it is preferable that two groups selected from these three groups are bonded to one of the benzene rings constituting the naphthalene ring, and the rest one group is bonded to the other benzene ring. The two groups bonded to the one of the benzene rings may be in an ortho-position or para-position relationship, but preferably is in a meta-position relationship. In the case of a meta-position relationship, a higher stability of the compound tend to be ensured, and in addition, the synthesis is easy.

In view of further suppressing the increase in the resistance of the organic conductor in a high humidity environment, the two groups bonded to one of the benzene rings are preferably the first sulfonic acid group and the second sulfonic acid group. When both the first sulfonic acid group and the second sulfonic acid group are bonded to one of the benzene rings, it is considered that both the first sulfonic acid group and the second sulfonic acid group can easily approach the conjugated polymer, and the conductivity of the organic conductor can be easily enhanced. Furthermore, as a result that one of the benzene rings approaches the conjugated polymer (i.e., the naphthalene ring approaches the conjugated polymer along the longer direction of the naphthalene ring (the direction in which two benzene rings are aligned)), as compared to when the naphthalene ring approaches the conjugated polymer along the shorter direction of the naphthalene ring, more additive molecules can easily come close to the conjugated polymer. This also contributes to increase the conductivity of the organic conductor. Moreover, since the carboxy group is bonded to the other benzene ring, the stability of the compound is further enhanced, and in addition, the sulfonic acid group(s) can easily preferentially coordinate with the conjugated polymer, and the electron acceptor function of the additive itself can be enhanced due to the electron-withdrawing property of the carboxy group. As a result, the effect of suppressing the resistance of the organic conductor can be further enhanced.

In view of further suppressing the increase in the resistance of the organic conductor in a high humidity environment, the additive preferably has the first sulfonic acid group and the second sulfonic acid group in a meta-position relationship, on one of the benzene rings constituting the naphthalene group.

From the viewpoint that the first sulfonic acid group and the second sulfonic acid group can easily preferentially coordinate with the conjugated polymer, the position of the carboxy group is preferably farther from the sulfonic acid group. In the naphthalene ring, when the carbon atom bonded to the carboxy group is referred to as a third carbon atom, the number of the carbon atoms present between the third carbon atom and the first carbon atom is preferably two or more. Likewise, the number of the carbon atoms present between the third carbon atom and the second carbon atom is preferably two or more. The number of the carbon atoms present between the third carbon atom and the first or second carbon atom can be determined in a similar manner to determining the number n as described above.

Among the carbon chains connecting the first carbon atom and the second carbon atom to each other, the shortest carbon chain preferably does not have a carboxy group. In this case, it is unlikely to occur that steric repulsion of the carboxy group inhibits the coordination via the first sulfonic acid group and the second sulfonic acid group. Therefore, it becomes easy to allow the additive to coordinate more firmly with the conjugated polymer via the first sulfonic acid group and the second sulfonic acid group. This as a result can further enhance the effect of suppressing the increase in the resistance of the organic conductor in a high humidity environment. In addition, in view of suppressing the steric hindrance due to the presence of the first substituent, the shortest carbon chain among the carbon chains connecting the first carbon atom and the second carbon atom to each other preferably does not have the first substituent.

By having the structure as described above, the additive can reliably exhibit a high bonding strength to the conjugated polymer. The interaction energy of the additive with respect to the conjugated polymer is preferably −14 kcal/mol or less, more preferably −15 kcal/mol or less, and may be as low as −17 kcal/mol or less or −19 kcal/mol or less. The interaction energy between naphthalene sulfonic acid and polypyrrole is approximately −10 kcal/mol.

The interaction energy of the additive with respect to the conjugated polymer can be determined by subtracting, from the potential energy of a composite of the additive and the conjugated polymer, the potential energies of the additive and the conjugated polymer when each is present alone. Each potential energy can be determined from the Schradinger equation using a quantum chemical calculation software (Gaussian09, available from Gaussian, Inc.).

The additive can also be represented by the following formula (1).

[Chem. 3]

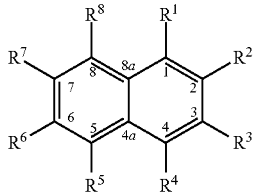

(1)

(In the formula, each of $R^1$ to $R^8$ is a hydrogen atom, a sulfonic acid group, a carboxy group, or a first substituent, at least two of $R^1$ to $R^8$ are a sulfonic acid group, at least one of $R^1$ to $R^8$ is a carboxy group, and two selected from $R^1$ to $R^8$ may be linked together to form a non-aromatic ring Z condensed with the naphthalene ring. The ring Z may have a second substituent. When two of $R^1$ to $R^8$ are a sulfonic acid group, the cases where each of $R^2$ and $R^6$ is a sulfonic acid group and each of $R^3$ and $R^7$ is a sulfonic acid group are excluded.)

In the formula (1), for the sulfonic acid group and the carboxy group, their numbers, and their positions, the above description can be referred to. For the first substituent, the ring Z, and the second substituent, too, the above description can be referred to.

Among the additives, 6,8-disulfo-2-naphthoic acid compound, 5,7-disulfo-2-naphthoic acid compound, 3,6-disulfo-1-naphthoic acid compound, and 4,8-disulfo-2-naphthoic acid compound are preferred. These compounds each include, in addition to the disulfonaphthoic acid, a disulfonaphthoic acid having a first substituent, and the like. In particular, 6,8-disulfo-2-naphthoic acid compound and 5,7-disulfo-2-naphthoic acid compound are preferred.

The additives may be used singly or in combination of two or more kinds.

[Method for Manufacturing Additive]

The above-described additive can be manufactured by a known method or its modified method. For example, a sulfonic acid group can be introduced into a naphthalene compound having a carboxy group through an electrophilic substitution reaction using fuming sulfuric acid, chlorosulfuric acid, or the like. The carboxy group may be protected with a protecting group, as needed.

The present disclosure also encompasses a method for manufacturing the above-described additive from a naphthalene compound having sulfonic acid groups and an amino group, by converting the amino group to a carboxy group. The conversion from the amino group to a carboxy group can be performed with high efficiency. Therefore, by using a manufacturing method as above, the additive can be obtained in high yield. This manufacturing method will be described more specifically below.

The method for manufacturing the additive includes a step of preparing a naphthalene compound having a naphthalene ring, at least two sulfonic acid groups bonded to the naphthalene ring, and at least one amino group bonded to the naphthalene ring, a step of converting the amino group to a cyano group, and a step of converting the cyano group to a carboxy group by hydrolysis, to produce the additive.

(Step of Preparing Naphthalene Compound)

A naphthalene compound having at least two sulfonic acid groups and at least one amino group ($—NH_2$) is prepared. As such a naphthalene compound, a commercially available product may be used, or a compound manufactured using a known manufacturing method or its modified method may be used. Such a naphthalene compound can be manufactured, for example, from a naphthalene compound having at least two sulfonic acid groups bonded to a naphthalene ring and at least one hydroxy group bonded to the naphthalene ring, by converting the hydroxy group to an amino group through the Bucherer reaction. For the Bucherer reaction conditions, known conditions can be used. The sulfonic acid group in the preparation step may be forming a salt. The salt may be, for example, an alkali metal salt, such as a sodium salt and a potassium salt.

(Step of Converting Amino Group to Cyano Group)

In the present step, first, by reacting the naphthalene compound prepared above with a nitrous acid compound, the amino group is converted to a diazonio group (substep 1). By reacting the diazonium compound obtained in the substep 1 with CuCN, a naphthalene compound having a cyano group is obtained (substep 2).

(Substep 1)

In the substep 1, as the nitrous acid compound, nitrous acid, a nitrite ester, a nitrite salt, or the like can be used. Preferred as the nitrite salt is an alkali metal salt, such as a sodium salt and a potassium salt. The nitrous acid compound is used in such an amount that the amount of the nitrite ions constituting the nitrous acid compound is equal to 1 equivalent or more than that, per 1 equivalent of the amino group of the naphthalene compound.

The substep 1 is preferably performed in the presence of an acid. As the acid, an inorganic acid, such as sulfuric acid, is preferably used. The acid may be used singly, or in combination of two or more kinds.

The amount of the acid is adjusted, for example, such that the amount of the anions constituting the acid is approximately 0.5 equivalents (e.g., 0.4 equivalents or more and 0.6 equivalents or less) per 1 equivalent of the nitrite ions (anions).

The substep 1 is performed, for example, at a temperature of −10° C. or higher and +10° C. or lower, preferably at a temperature of −5° C. or higher and +5° C. or lower. The substep 1 may be performed in the air, but is preferably performed in an inert gas (e.g., helium gas, nitrogen gas, argon gas) atmosphere. The substep 1 may be performed under elevated or reduced pressure, but can be performed under atmospheric pressure. The time for the substep 1 is, for example, 1 hour or more and 8 hours or less, and may be 1 hour or more and 6 hours or less, or 3 hours or more and 8 hours or less.

In the substep 1, at least a part of the sulfonic acid groups may be forming a salt. The salt may be, for example, an alkali metal salt, such as a sodium salt and a potassium salt.

In the substep 1, after treating with an acid, treatment with a base may be performed as needed. The base is added until the pH of the mixture reaches 9 to 12. As the base, an inorganic base may be used. The inorganic base includes, for example, a metal hydroxide, and an alkali metal carbonate. Examples of the metal hydroxide include an alkali metal hydroxide, such as sodium hydroxide and potassium hydroxide, and calcium hydroxide. Examples of the alkali metal carbonate include a hydrogen carbonate salt, such as sodium hydrogen carbonate and potassium hydrogen carbonate. The base may be used singly, or in combination of two or more kinds. In view of efficiently producing a diazonium compound, it is preferable to perform treatment with a weak base, such as an alkali metal carbonate, and then, perform treatment with a strong base, such as a metal hydroxide.

The base is used, for example, in the form of an aqueous solution. The amount of the base or its aqueous solution to be used is adjusted such that, for example, the pH of the mixture falls in the range of 9 to 12.

(Substep 2)

In the substep 2, the diazonium compound obtained in the substep 1 is reacted with CuCN, to convert the diazonio group to a cyano group. This reaction is called the Sandmeyer reaction.

CuCN is used in such an amount that, for example, the cyano group is 1.0 equivalent or more and 1.3 equivalents or less, per 1 equivalent of the diazonio group.

The substep 2 is performed at a temperature of, for example, 0° C. or higher and 50° C. or lower, preferably at a temperature of 0° C. or higher and 40° C. or lower. The substep 2 may be performed in the air, but is preferably performed in an inert gas (e.g., helium gas, nitrogen gas, argon gas) atmosphere. The substep 2 may be performed under elevated or reduced pressure, but can be performed under atmospheric pressure. The time for the substep 2 is, for example, 2 hours or more and 24 hours or less.

The substep 2 may be performed in the presence of an alkali metal cyanide. The alkali metal cyanide may be, for example, potassium cyanide or sodium cyanide. The alkali metal cyanide is used in an amount of, for example, 1.0 equivalent or more and 3.0 equivalents or less, per 1 equivalent of the sulfonic acid group included in the diazonium compound.

(Step of Converting Cyano Group to Carboxy Group)

In the naphthalene compound having a cyano group obtained in the above step, the cyano group is converted to a carboxy group by hydrolysis. In this way, the additive described above can be produced.

The hydrolysis can be performed, for example, in the presence of a base. As the base, for example, an inorganic base, such as a metal hydroxide, can be used. Examples of the metal hydroxide include an alkali metal hydroxide, such as sodium hydroxide and potassium hydroxide, and calcium hydroxide.

The amount of the base may be 400 parts by mass or more and 2000 parts by mass or less, relative to 100 parts by mass of the naphthalene compound.

The hydrolysis is performed at a temperature of, for example, 100° C. or higher and 150° C. or lower, preferably at a temperature of 100° C. or higher and 140° C. or lower. The hydrolysis may be performed in the air or in an inert gas (e.g., helium gas, nitrogen gas, argon gas) atmosphere. The hydrolysis may be performed under elevated or reduced pressure, but can be performed under atmospheric pressure. The time for the hydrolysis is, for example, 1 hour or more and 24 hours or less.

After the hydrolysis, acid treatment may be performed as needed. By performing acid treatment, the carboxy group and the sulfonic acid group can be converted into a free form or an anionic form. As the acid to be used, an inorganic acid, such as sulfuric acid, is preferred. The amount of the acid is determined depending on the total number of the carboxy groups and the sulfonic acid groups.

The product in each step may be directly subjected to the next step, or may be subjected to the next step after separation or purification, as needed, using a known separation method, a known purification method, or a combination thereof.

The additive is separated or purified from the finally obtained reaction mixture containing the additive, using, for example, a known separation method, a known purification method, or a combination thereof.

The separation method and the purification method used for separation or purification of the product in each step and the additive may be, for example, at least one selected from the group consisting of filtration, washing, extraction, distillation, crystallization, recrystallization, and chromatography, but are not limited thereto.

[Organic Conductor]

The organic conductor contains the above additive and a conjugated polymer. The additive has excellent electron acceptor performance and can be functioned as a dopant for the conjugated polymer. By using the additive, a high bonding strength with the conjugated polymer can be obtained. Therefore, in a high humidity environment, even when the organic conductor adsorbs water molecules, the dedoping is suppressed, and the increase in ΔESR can be suppressed. Hence, even in a high humidity environment, the electrolytic capacitor can be used with high reliability.

The conjugated polymer may be any polymer that becomes a good conductor by the action of the additive, and includes, for example, π-conjugated polymer and σ-conjugated polymer. The organic conductor may contain the above additive singly or in combination of two or more kinds. The organic conductor may contain the conjugated polymer singly or in combination of two or more kinds.

Examples of the conjugated polymer include polymers whose backbones are polypyrrole, polythiophene, polyaniline, polyfuran, polyacetylene, polyphenylene, polyphenylenevinylene, polyacene, polythiophenevinylene, or the like. These polymers also include a homopolymer, a copolymer of two or more kinds of monomers, and derivatives thereof (e.g., a substituted product having a substituent). For example, polythiophene includes poly(3,4-ethylenedioxythiophene).

Among the conjugated polymers, a conjugated polymer including a monomer unit corresponding to a pyrrole compound is preferred. When such a conjugated polymer is combined with the above additive, a higher bonding strength is likely to be obtained. Examples of the pyrrole compound include pyrrole, a condensed compound of pyrrole and an aliphatic ring or a heterocycle, and substituted products thereof (e.g., a compound having a substituent). Examples of the substituent include an alkyl group (including an aminoalkyl group and a hydroxyalkyl group), an amino group, a substituted amino group, an alkoxy group, a hydroxy group, a mercapto group, and a halogen atom. The pyrrole or condensed compound may have one kind or two or more kinds of these substituents. The conjugated polymer preferably has a structure in which the monomer unit corresponding to a pyrrole compound is repeated.

The weight average molecular weight (Mw) of the conjugated polymer is not limited, but is, for example, 1,000 or more and 1,000,000 or less.

In the present specification, the weight average molecular weight (Mw) is a value based on polystyrene as measured by gel permeation chromatography (GPC). The GPC is usually measured using a polystyrene gel column and water/methanol (8/2 by volume) serving as a mobile phase.

The amount of the additive is, for example, 0.1 parts by mass or more and 400 parts by mass or less, may be 1 part by mass or more and 350 parts by mass or less, and may be 10 parts by mass or more 300 parts by mass or less, relative to 100 parts by mass of the conjugated polymer.

In such an organic conductor, the increase in resistance is suppressed even in a high humidity environment. The organic conductor, therefore, is excellent in reliability and can be used in various electronic devices. Especially, it can be suitably used for the solid electrolyte of an electrolytic capacitor.

[Electrolytic Capacitor]

An electrolytic capacitor includes an anode body having a dielectric layer at a surface and a solid electrolyte covering part of the dielectric layer. The solid electrolyte includes the above organic conductor. The solid electrolyte constitutes a cathode section of the electrolytic capacitor.

(Anode Body)

The anode body can include a valve metal, an alloy containing a valve metal, a compound containing a valve metal, and the like. These materials can be used singly or in combination of two or more kinds. As the valve metal, for example, aluminum, tantalum, niobium, and titanium are preferably used. The anode body having a porous surface can be obtained by, for example, roughening a surface of a base material (e.g., foil-like or plate-like base material) containing a valve metal, by etching or other methods. The anode body may be a molded body of valve metal-containing particles or a sintered body thereof. The sintered body has a porous structure.

(Dielectric Layer)

The dielectric layer is formed by anodizing the valve metal at the surface of the anode body by treatment such as chemical conversion. The dielectric layer is formed, for example, so as to cover at least part of the anode body. The dielectric layer is usually formed at the surface of the anode body. Since the dielectric layer is formed at the surface of the porous anode body, it is formed along the pores and the inner walls of the recesses (pits) (including the inner walls of the pores) at the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited thereto, and may be a layer that functions as a dielectric.

(Cathode Section)

The cathode section includes at least a solid electrolyte covering at least part of the dielectric layer. The cathode section usually includes a solid electrolyte and a cathode leading layer covering at least part of the solid electrolyte.

(Solid Electrolyte)

The solid electrolyte includes the above organic conductor and is formed so as to cover the dielectric layer. The solid electrolyte does not necessarily cover the whole (entire surface) of the dielectric layer. The solid electrolyte layer may be formed so as to cover at least part of the dielectric layer. In the electrolytic capacitor, the solid electrolyte may be forming a solid electrolyte layer.

The solid electrolyte includes the above additive, but may include another dopant as needed. As the other dopant, at least one selected from the group consisting of an anion and a polyanion is used. Examples of the anion include sulfate ion, nitrate ion, phosphate ion, borate ion, organic sulfonate ion, and carboxylate ion. Examples of the polyanion include polyvinyl sulfonic acid, polystyrene sulfonic acid, polyallyl sulfonic acid, polyacryl sulfonic acid, polymethacryl sulfonic acid, polyacrylic acid, and polymethacrylic acid. The polyanion also include polyester sulfonic acid, phenol sulfonic acid novolak resin, and the like.

In view of allowing the effect of the above additive to be more effectively exhibited, the proportion of the above additive in the whole dopant is, for example, preferably 90 mass % or more, and may be 95 mass % or more. The proportion of the above additive is 100 mass % or less. The above additive alone may be used as the dopant.

The solid electrolyte may contain another additive. Examples of the other additive include a known additive other than the dopant, and a known conductive material other than the organic conductor (e.g., a conductive inorganic material, such as manganese dioxide).

The solid electrolyte can be formed by, for example, subjecting constituent monomers of the conjugated polymer to at least one of chemical polymerization and electrolytic polymerization, on the dielectric layer, in the presence of the above additive. Alternatively, a solution in which the conjugated polymer and the additive are dissolved, or, a dispersion liquid in which the conjugated polymer and the additive are dispersed may be brought into contact with the dielectric layer, so that a solid electrolyte covering the dielectric layer can be formed. After the solution or dispersion liquid is brought into contact with the dielectric layer, drying or heat treatment may be performed as needed.

The solid electrolyte layer may be a single layer or may be composed of multiple layers. When the solid electrolyte layer is composed of multiple layers, the composition of the layer (e.g., the kind of the conjugated polymer, the kind of the dopant or additive, the proportion of each component) may be the same in all the layers or different from layer to layer.

A layer for enhancing the adhesion and the like may be interposed, as needed, between the dielectric layer and the solid electrolyte.

(Cathode Leading Layer)

The cathode leading layer includes, for example, a carbon layer formed on a surface of the solid electrolyte and a metal paste layer formed on a surface of the carbon layer. The carbon layer and the metal paste layer are sequentially laminated, forming the cathode leading layer.

The carbon layer can be formed by immersing the anode body having the dielectric layer which is at least partially covered with a solid electrolyte, in a dispersion liquid containing a conductive carbon, or applying a paste containing a conductive carbon onto a surface of the solid electrolyte. As the conductive carbon, for example, graphites, such as artificial graphite and natural graphite, are used. As the dispersion liquid and the paste, for example, a mixture of a conductive carbon dispersed in a water-based liquid medium is used.

The metal paste layer can be formed by, for example, laminating a metal particle-containing composition on a surface of the carbon layer. As the metal paste layer, for example, a silver paste layer formed using a composition containing silver particles and a resin (binder resin) can be used. As the resin, a thermoplastic resin can be used, but a thermosetting resin, such as an imide-series resin or an epoxy resin, is preferably used.

The configuration of the cathode leading layer is not limited to the above, and may be a configuration having a current collecting function.

Others

For example, a capacitor element including the anode body and the cathode section is housed in a container or sealed with a package body or the like, so that an electrolytic capacitor can be obtained. The electrolytic capacitor may be of a chip type or a laminated type, and may be of a wound type. The electrolytic capacitor includes at least one capacitor element, and may include two or more capacitor elements. The configuration of the capacitor element may be selected depending on the type of the electrolytic capacitor. For example, the electrolytic capacitor may include a stack of two or more capacitor elements, and may include two or more wound capacitor elements. The capacitor element may have, as needed, a cathode body formed using a metal foil, like the anode body. When a metal foil is used in the cathode body, a separator may be disposed between the metal foil and the anode body.

All configurations described in the present specification can be combined in any combination.

FIG. 1 is a cross-sectional view schematically illustrating the structure of an electrolytic capacitor according to one embodiment of the present disclosure. As illustrated in FIG. 1, an electrolytic capacitor 1 includes a capacitor element 2, a resin sealing material 3 sealing the capacitor element 2, and an anode terminal 4 and a cathode terminal 5 each at least partially exposed outside the resin sealing material 3. The anode terminal 4 and the cathode terminal 5 can be constituted of, for example, a metal, such as copper or a copper alloy. The resin sealing material 3 has a substantially rectangular parallelepiped outer shape, and the electrolytic capacitor 1 also has a substantially rectangular parallelepiped outer shape. As the material of the resin sealing material 3, for example, epoxy resin can be used.

The capacitor element 2 includes an anode body 6, a dielectric layer 7 covering the anode body 6, and a cathode section 8 covering the dielectric layer 7. The cathode section 8 includes a solid electrolyte layer 9 covering the dielectric layer 7, and a cathode leading layer 10 covering the solid electrolyte layer 9. The cathode leading layer 10 has a carbon layer 11 and a metal paste layer 12.

The anode body 6 includes a region facing the cathode section 8 and a region not facing the cathode section 8. Of the region not facing the cathode section 8 of the anode body 6, in a portion adjacent to the cathode section 8, a separation layer 13 with insulating property is formed so as to cover in a strip shape the surface of the anode body 6, thereby restricting the contact between the cathode section 8 and the anode body 6. Of the region not facing the cathode section 8 of the anode body 6, part of the other portion is electrically connected to the anode terminal 4 by welding. The cathode terminal 5 is electrically connected to the cathode section 8 via an adhesive layer 14 formed of a conductive adhesive.

Principal surfaces 4S and 5S of the anode terminal 4 and the cathode terminal 5 are exposed from the same surface of the resin sealing material 3. The exposed surface is used for solder connection with a substrate (not shown) on which the electrolytic capacitor 1 is to be mounted.

EXAMPLES

The present disclosure will be described below in details with reference to Examples. The present disclosure, however, is not limited to the following Examples.

Examples 1 to 4 (Synthesis of Additive)

Using the following naphthalene compounds (a1) to (a4) as starting materials, respectively, naphthalene compounds (A1) to (A4) having a first sulfonic acid group, a second sulfonic acid group, and a carboxy group were synthesized. The naphthalene compound (A1) is 6,8-disulfo-2-naphthoic acid, and the naphthalene compound (A2) is 5,7-disulfo-2-naphthoic acid. The naphthalene compound (A3) is 3,6-disulfo-1-naphthoic acid, and the naphthalene compound (A4) is 4,8-disulfo-2-naphthoic acid.

[Chem. 4]

(a1)

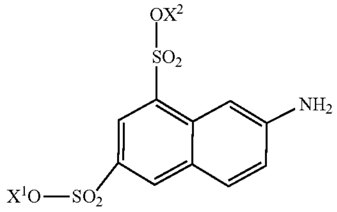

(A1)

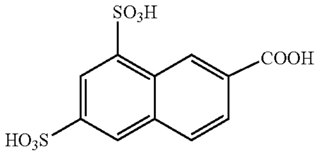

(a2)

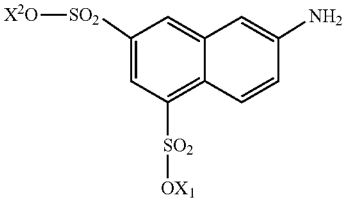

(A2)

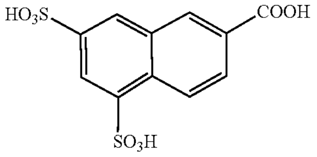

(a3)

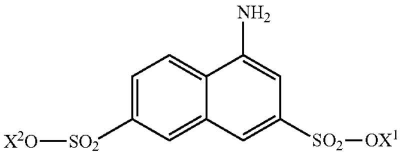

(A3)

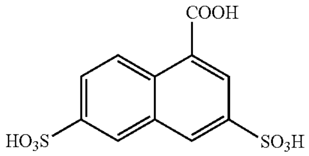

(a4)

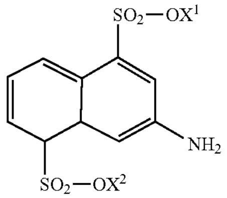

(A4)

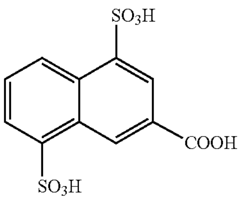

(In the formula, $X^1$ and $X^2$ are each independently a hydrogen atom, Na or K.)

(1) Step of Converting Amino Group to Cyano Group

A predetermined amount of each of the naphthalene compounds (a1) to (a4) was dissolved in water, to prepare an aqueous solution. Sulfuric acid was added to the resulting aqueous solution and mixed, to which an aqueous sodium nitrite solution was further added, and the resulting mixture was stirred at −5° C. to +5° C. for 1 to 6 hours. In this way, by converting the amino group to a diazonio group, a diazonium compound corresponding to each naphthalene compound was synthesized. The sodium nitrite was used in such an amount that the amount of nitrite ions was equal to 1 equivalent or slightly more than that, per 1 equivalent of the amino group. The sulfuric acid was used in an amount of 1 mol per 1 mol of nitrite ions.

To the resulting reaction mixture, an aqueous alkaline solution was added until the pH reached 9 to 12. As the alkaline aqueous solution, first, an aqueous sodium hydrogencarbonate solution was used, and an aqueous sodium hydroxide solution was further added.

To the resulting mixture, an aqueous solution of CuCN and KCN was added, and stirred at 0° C. to 40° C. for 8 hours, to allow a reaction to proceed. In this way, by converting the diazonio group to a cyano group, naphthalene compounds in which the amino group was converted to a cyano group in each of (a1) to (a4) were obtained. The resulting naphthalene compounds were purified using recrystallization or the like.

(2) Step of Converting Cyano Group to Carboxy Group

The naphthalene compounds obtained in (1) above were each dissolved in water (solvent), to which a base (sodium hydroxide) was added at a ratio of 3000 parts by mass relative to 100 parts by mass of the naphthalene compound. The mixtures were each stirred at 140° C. for 8 hours, to allow a reaction to proceed. The resulting reaction mixtures were each acid-treated by adding sulfuric acid until the pH of the mixture reached 1. The resulting mixtures were purified using recrystallization or the like, to separate the naphthalene compounds (A1) to (A4). In this way, additives were synthesized.

Examples 5 to 8 (Fabrication of Electrolytic Capacitor)

Electrolytic capacitors 1 as illustrated FIG. 1 were fabricated in the following manner, and evaluated for their characteristics.

(1) Step of Preparing Anode Body 6

An aluminum foil (thickness: 100 μm) serving as a base material was surface-roughened by etching, to prepare an anode body 6.

(2) Step of Forming Dielectric Layer 7

The anode body 6 was immersed in a phosphoric acid solution with a concentration of 0.3 mass % and a temperature of 70° C., to which a DC voltage of 70 V was applied for 20 minutes, to form a dielectric layer 7 containing aluminum oxide.

(3) Step of Forming Solid Electrolyte Layer 9

A solid electrolyte layer 9 containing polypyrrole and each additive (A1) to (A4) as a dopant was formed on the dielectric layer 7, by electrolytic polymerization, in the following procedure.

First, an aqueous solution containing a pyrrole monomer and each of the additives (A1) to (A4) was prepared. The pyrrole monomer concentration and the additive concentration in the aqueous solution were 0.5 mol/L and 0.3 mol/L, respectively. Sulfuric acid was added to the aqueous solution, to adjust the pH to 3.0.

The anode body 6 with the dielectric layer 7 formed in the above (2) and a counter electrode were immersed in the resulting aqueous solution, and, at 25° C., electrolytic polymerization was allowed to proceed at a polymerization voltage of 3 V, to form the solid electrolyte layer 9.

(4) Step of Forming Cathode Leading Layer 10

A dispersion liquid of graphite particles in water was applied onto the surface of the solid electrolyte layer 9 obtained in (3) above, and dried in the atmosphere, to form a carbon layer 11. Next, a silver paste containing silver particles and an epoxy resin was applied onto the surface of the carbon layer 11, and heated, to form a metal paste layer 12. A cathode leading layer 10 constituted of the carbon layer 11 and the metal paste layer 12 was thus formed.

In this way, capacitor elements 2 were produced.

(5) Fabrication of Electrolytic Capacitor

The cathode leading layer 10 of each of the capacitor elements 2 obtained in (4) above and one end of a cathode terminal 5 were joined to each other with a conductive adhesive. One end of the anode body 6 protruding from the capacitor element 2 and one end of an anode terminal 4 were joined to each other by laser welding.

Next, a resin sealing material 3 formed of an insulating resin was formed around the capacitor element 2. At this time, the other end of the anode terminal 4 and the other end of the cathode terminal 5 were extended outside from the resin sealing material 3.

In this way, the electrolytic capacitors 1 having a rated voltage of 2 V and a capacitance of 30 μF were completed.

(6) Evaluation

The following evaluations were performed on the electrolytic capacitors or the additives.

(a) ΔESR

In a 20° C. environment, the initial ESR (=$Z_0$) (mΩ) at a frequency of 100 kHz of each electrolytic capacitor was measured using an LCR meter for 4-terminal measurement.

After applying the rated voltage to the electrolytic capacitor for 125 hours in an 85° C. and 85% RH environment, the ESR (=Z) (mΩ) was measured in a 20° C. environment in a similar manner to measuring the initial ESR. The ΔESR representing the rate of change in a high humidity environment was determined from $\Delta ESR=(Z-Z_0)/Z_0$.

(b) Interaction Energy

The interaction energy between the additive and the polypyrrole was calculated in the already-described manner.

Comparative Example 1

An electrolytic capacitor was produced and evaluated in the same manner as in Example 1, except that naphthalene sulfonic acid (B1) was used instead of the naphthalene compound (A1).

Comparative Example 2

An electrolytic capacitor was produced and evaluated in the same manner as in Example 1, except that 3,7-disulfo-2-naphthoic acid represented by the following formula (B2) was used instead of the naphthalene compound (A1).

[Chem. 5]

(B2)

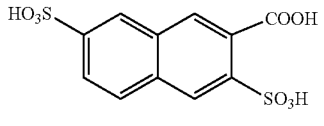

The 3,7-disulfo-2-naphthoic acid (B2) was synthesized by the following procedure.

First, using the Bucherer reaction, 3,7-diamino-2-naphthoic acid was produced from 3,7-dihydroxy-2-naphthoic acid. Specifically, a predetermined amount of 3,7-dihydroxy-2-naphthoic acid was added to an aqueous ammonia solution containing sodium sulfite at a predetermined concentration, and stirred at 100° C. for 8 hours, to produce 3,7-diamino-2-naphthoic acid. From the reaction mixture, the 3,7-diamino-2-naphthoic acid was purified using recrystallization or the like.

A predetermined amount of the obtained 3,7-diamino-2-naphthoic acid was dissolved in water, to prepare an aqueous solution. Sulfuric acid was added to the aqueous solution and mixed, to which an aqueous sodium nitrite solution was further added, and the resulting mixture was stirred at 0° C. for approximately 2 hours. In this way, by converting the amino group to a diazonio group, a diazonium compound was synthesized. The sodium nitrite was used in such an amount that the amount of nitrite ion was equal to 1 equivalent or slightly more than that, per 1 equivalent of the amino group. The sulfuric acid was used in an amount of 1 mol per 1 mol of nitrite ions.

To the resulting reaction mixture, an aqueous alkaline solution was added until the pH reached 9 to 12. As the alkaline aqueous solution, first, an aqueous sodium hydrogencarbonate solution was used, and an aqueous sodium hydroxide solution was further added.

To the resulting mixture, an aqueous solution of CuCl was added, and stirred at room temperature (20 to 35° C.) for 8 hours, to allow a reaction to proceed. In this way, by converting the diazonio group to chloro, 3,7-dichloro-2-naphthoic acid sodium salt was obtained. The resulting 3,7-dichloro-2-naphthoic acid sodium salt was purified using recrystallization or the like.

The obtained 3,7-dichloro-2-naphthoic acid sodium salt was dissolved in dimethylacetamide, to prepare a solution. To this solution, sodium isopropoxide was added, and the mixture was stirred at 100° C. for 18 hours. Metal sodium was added to the resulting reaction mixture, and stirred at 100° C. for 32 hours, to allow a reaction to proceed, so that 3,7-di(sodiumthio)-2-naphthoic acid sodium salt was produced. From the reaction mixture, the 3,7-di(sodiumthio)-2-naphthoic acid sodium salt was purified using recrystallization or the like. Here, the sodium isopropoxide was added in an amount of 2.5 equivalents per 1 equivalent of the chloro in the 3,7-dichloro-2-naphthoic acid. The metal sodium was added in an amount of 7 equivalents per 1 equivalent of the chloro.

The 3,7-di(sodiumthio)-2-naphthoic acid sodium salt was dissolved in a mixed solvent of chloroform and methanol. A hydrogen peroxide solution was added to the resulting solution, and mixed, to convert the —SNa group to —$SO_3Na$ group. Next, by adding sulfuric acid to the reaction mixture, the —$SO_3Na$ group was converted to a sulfonic acid group, and at the same time, the —COONa group was converted to a carboxy group. Thus, 3,7-disulfo-2-naphthoic acid (B2) was obtained. From the reaction mixture, the 3,7-disulfo-2-naphthoic acid (B2) was purified using recrystallization or the like.

The evaluation results of Examples and Comparative Examples are shown in Table 1. In Table 1, E1 to E4 represent Examples 1 to 4, and C1 and C2 represent Comparative Examples 1 and 2.

TABLE 1

| | Additive | | |
| --- | --- | --- | --- |
| | Kind | Interaction energy (kcal/mol) | ΔESR |
| E1 | 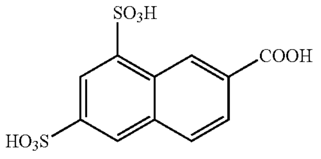 (A1) | −20.07 | 0.016 |
| E2 | 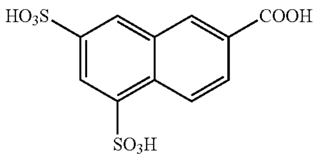 (A2) | −19.89 | 0.018 |
| E3 | 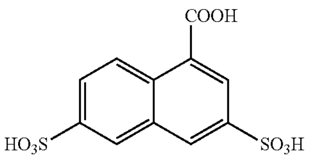 (A3) | −15.72 | 0.24 |
| E4 | 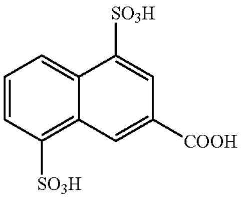 (A4) | −14.70 | 0.46 |
| C1 | naphthalene sulfonic acid (B1) | approx. −10 | 8.8 |
| C2 | 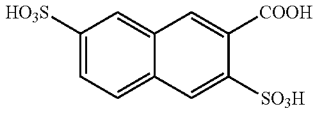 (B2) | −14.10 | 0.67 |

As shown in Table 1, in E1 to E4 in which the additives A1 to A4 were used, the increase in the rate of change in ESR in a high humidity environment was significantly reduced, as compared to in C1 in which naphthalene sulfonic acid was used and C2 in which 3,7-disulfo-2-naphthoic acid was used. The smaller the interaction energy between the additive and the conjugated polymer was, the smaller the ΔESR was. This indicates that in E1 to E4, a high bonding strength between the additive and the conjugated polymer was obtained, which suppressed the increase in the resistance of the solid electrolyte layer even in a high humidity environment, and suppressed the increase in ESR.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the present disclosure, it is possible to provide an additive that can remarkably improve the moisture resistance of an organic conductor. Such an additive, when used in an organic conductor and utilized for various electronic devices, such as an electrolytic capacitor, can stabilize the product quality even in a high humidity environment.

REFERENCE SIGNS LIST

1: electrolytic capacitor, 2: capacitor element, 3: resin sealing material, 4: anode terminal, 4S: principal surface of anode terminal, 5: cathode terminal, 5S: principal surface of cathode terminal, 6: anode body, 7: dielectric layer, 8: cathode section, 9: solid electrolyte layer, 10: cathode leading layer, 11: carbon layer, 12: metal paste layer, 13: separation layer, 14: adhesive layer

The invention claimed is:

1. An organic conductor, comprising:

a conjugated polymer; and an additive, wherein:

the additive is at least one selected from the group consisting of 6,8-disulfo-2-naphthoic acid compound, 5,7-disulfo-2-naphthoic acid compound, and 3,6-disulfo-1-naphthoic acid compound.

2. The organic conductor according to claim 1, wherein the conjugated polymer includes a monomer unit corresponding to a pyrrole compound.

3. The organic conductor according to claim 1, wherein an interaction energy between the additive and the conjugated polymer contained in the organic conductor is −14 kcal/mol or less.

4. An electrolytic capacitor, comprising:

an anode body having a dielectric layer at a surface, and a solid electrolyte covering part of the dielectric layer, wherein the solid electrolyte includes the organic conductor of claim 1.

5. A method for manufacturing the organic conductor of claim 1, the method comprising:

a step of preparing a naphthalene compound having a naphthalene ring, two sulfonic acid groups bonded to the naphthalene ring, and at least one amino group bonded to the naphthalene ring;

a step of converting the at least one amino group to a cyano group; and a step of converting the cyano group to a carboxy group by hydrolysis, to produce the additive.

* * * * *